United States Patent
Gao et al.

(10) Patent No.: US 9,508,362 B2
(45) Date of Patent: *Nov. 29, 2016

(54) WRITE MANAGEMENT FOR INTERLACED MAGNETIC RECORDING DEVICES

(71) Applicant: Seagate Technology LLC, Cupertino, CA (US)

(72) Inventors: Kaizhong Gao, North Oaks, MN (US); Wenzhong Zhu, Apple Valley, MN (US); Edward Gage, Lakeville, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/686,456

(22) Filed: Apr. 14, 2015

(65) Prior Publication Data

US 2016/0148641 A1 May 26, 2016

Related U.S. Application Data

(60) Provisional application No. 62/083,696, filed on Nov. 24, 2014, provisional application No. 62/083,732, filed on Nov. 24, 2014.

(51) Int. Cl.
| | |
|---|---|
| *G11B 11/00* | (2006.01) |
| *G11B 5/09* | (2006.01) |
| *G11B 20/12* | (2006.01) |
| *G11B 5/012* | (2006.01) |
| *G11B 20/18* | (2006.01) |
| *G11B 11/105* | (2006.01) |
| *G11B 5/00* | (2006.01) |

(52) U.S. Cl.
CPC ............... *G11B 5/09* (2013.01); *G11B 5/012* (2013.01); *G11B 20/1217* (2013.01); *G11B 20/1833* (2013.01); *G11B 11/10506* (2013.01); *G11B 11/10515* (2013.01); *G11B 11/10521* (2013.01); *G11B 11/10595* (2013.01); *G11B 2005/0021* (2013.01); *G11B 2020/1222* (2013.01); *G11B 2020/1238* (2013.01)

(58) Field of Classification Search
CPC .................. G11B 11/10595; G11B 11/10515; G11B 7/126; G11B 5/314; G11B 5/6088; G11B 2005/0021
See application file for complete search history.

(56) References Cited

U.S. PATENT DOCUMENTS

| | | | |
|---|---|---|---|
| 4,298,897 A | 11/1981 | Arter et al. | |
| 4,622,601 A | 11/1986 | Isozaki et al. | |
| 4,646,168 A * | 2/1987 | Sonobe | G11B 5/00 360/18 |
| 4,771,346 A | 9/1988 | Shoji et al. | |
| 4,803,571 A | 2/1989 | Fujioka et al. | |

(Continued)

FOREIGN PATENT DOCUMENTS

| | | |
|---|---|---|
| EP | 0484774 A2 | 5/1992 |
| EP | 1564736 | 8/2005 |

(Continued)

*Primary Examiner* — Tan X Dinh
(74) *Attorney, Agent, or Firm* — Holzer Patel Drennan (57) ABSTRACT

A storage device includes a controller that implements an interlaced magnetic recording scheme with prioritized random access. According to one implementation, a controller is configured to write data at a first linear density to alternating data tracks and write data at a second linear density to one or more data tracks interlaced with the alternating data tracks.

20 Claims, 5 Drawing Sheets

(56) References Cited

U.S. PATENT DOCUMENTS

| | | |
|---|---|---|
| 4,853,799 A | 8/1989 | Aikawa |
| 5,010,430 A | 4/1991 | Yamada et al. |
| 5,285,341 A | 2/1994 | Suzuki et al. |
| 5,402,270 A | 3/1995 | McDonnell et al. |
| 5,760,993 A * | 6/1998 | Purkett ............... G11B 21/083 360/48 |
| 5,892,634 A | 4/1999 | Ito et al. |
| 5,978,168 A | 11/1999 | Mathews et al. |
| 6,052,797 A | 4/2000 | Ofek et al. |
| 6,104,562 A | 8/2000 | Ottesen et al. |
| 6,185,063 B1 | 2/2001 | Cameron |
| 6,710,960 B1 | 3/2004 | Yorimitsu |
| 6,768,605 B2 | 7/2004 | Yamamoto |
| 7,130,152 B1 | 10/2006 | Raymond et al. |
| 7,259,927 B2 | 8/2007 | Harris |
| 7,393,066 B2 | 7/2008 | Dugas et al. |
| 7,440,222 B2 | 10/2008 | Nakamura et al. |
| 7,573,682 B2 | 8/2009 | Pust et al. |
| 7,872,829 B2 | 1/2011 | Sakai |
| 7,907,360 B2 | 3/2011 | Mak et al. |
| 7,957,093 B2 | 6/2011 | Brand |
| 7,965,465 B2 | 6/2011 | Sanvido et al. |
| 8,023,215 B1 | 9/2011 | Ghaly et al. |
| 8,310,777 B2 | 11/2012 | Biskeborn et al. |
| 8,310,782 B2 | 11/2012 | Song et al. |
| 8,531,792 B1 | 9/2013 | Burd et al. |
| 8,531,793 B2 | 9/2013 | Bandic et al. |
| 8,599,510 B1 | 12/2013 | Fallone |
| 8,693,123 B1 * | 4/2014 | Guo ............... G11B 5/59688 360/48 |
| 8,699,159 B1 | 4/2014 | Malina |
| 8,699,162 B1 | 4/2014 | Grobis et al. |
| 8,711,517 B2 | 4/2014 | Erden et al. |
| 8,854,752 B2 | 10/2014 | Jin et al. |
| 8,867,161 B2 | 10/2014 | Emo et al. |
| 8,873,178 B2 | 10/2014 | Erden et al. |
| 8,913,335 B2 | 12/2014 | Coker et al. |
| 8,917,469 B1 * | 12/2014 | Guo ............... G11B 20/18 360/49 |
| 8,929,186 B1 | 1/2015 | Sharma et al. |
| 8,976,478 B1 | 3/2015 | Harllee, III et al. |
| 9,053,712 B1 | 6/2015 | Guo et al. |
| 9,058,829 B1 | 6/2015 | Wolf et al. |
| 9,082,458 B1 * | 7/2015 | Tang ............... G11B 20/1258 |
| 9,087,541 B1 | 7/2015 | Pokharel et al. |
| 9,099,103 B1 * | 8/2015 | Krichevsky ............ G11B 5/012 |
| 9,105,302 B1 | 8/2015 | Erden et al. |
| 9,111,575 B1 | 8/2015 | Zhou et al. |
| 9,111,578 B1 | 8/2015 | Hassel et al. |
| 9,129,658 B1 | 9/2015 | Yamamoto |
| 9,142,246 B1 | 9/2015 | Trantham et al. |
| 9,153,287 B1 | 10/2015 | Hamilton et al. |
| 9,324,362 B1 * | 4/2016 | Gao ............... G11B 20/1833 |
| 9,396,062 B1 | 7/2016 | Sridhara et al. |
| 2002/0035666 A1 | 3/2002 | Beardsley et al. |
| 2002/0035704 A1 | 3/2002 | Wilson |
| 2002/0105867 A1 * | 8/2002 | Tamaru ............... G11B 7/0045 369/47.3 |
| 2005/0078399 A1 * | 4/2005 | Fung ............... G11B 20/00007 360/69 |
| 2005/0157597 A1 | 7/2005 | Sendur et al. |
| 2006/0117333 A1 * | 6/2006 | Taguchi ............... G11B 5/02 720/659 |
| 2006/0215511 A1 | 9/2006 | Shin et al. |
| 2007/0047415 A1 | 3/2007 | Chang |
| 2007/0050593 A1 | 3/2007 | Chen et al. |
| 2007/0174582 A1 | 7/2007 | Feldman |
| 2008/0002272 A1 | 1/2008 | Riedel |
| 2008/0239901 A1 | 10/2008 | Tsunokawa et al. |
| 2008/0316639 A1 | 12/2008 | Tang et al. |
| 2009/0244775 A1 | 10/2009 | Ehrlich |
| 2009/0251821 A1 | 10/2009 | Song et al. |
| 2010/0027406 A1 | 2/2010 | Krause et al. |
| 2010/0271727 A1 | 10/2010 | Namkoong et al. |
| 2010/0321817 A1 | 12/2010 | Aida et al. |
| 2012/0014013 A1 | 1/2012 | Bandic et al. |
| 2013/0148225 A1 | 6/2013 | Coker et al. |
| 2013/0155826 A1 | 6/2013 | Zhang et al. |
| 2013/0294207 A1 | 11/2013 | Erden et al. |
| 2014/0016224 A1 | 1/2014 | Unoki et al. |
| 2014/0043708 A1 | 2/2014 | Erden et al. |
| 2014/0055881 A1 | 2/2014 | Zaharris |
| 2014/0153134 A1 | 6/2014 | Han et al. |
| 2014/0160589 A1 | 6/2014 | Deki et al. |
| 2015/0178161 A1 | 6/2015 | Burd et al. |
| 2016/0148630 A1 | 5/2016 | Rausch |
| 2016/0148635 A1 | 5/2016 | Zhu et al. |
| 2016/0148636 A1 * | 5/2016 | Ma ............... G11B 5/09 369/13.26 |
| 2016/0148637 A1 * | 5/2016 | Rausch ............... G11B 5/09 369/13.26 |
| 2016/0148642 A1 * | 5/2016 | Gao ............... G11B 5/09 360/48 |
| 2016/0148643 A1 * | 5/2016 | Gao ............... G11B 20/1217 369/13.35 |
| 2016/0148644 A1 * | 5/2016 | Zhu ............... G11B 20/1217 360/48 |
| 2016/0148645 A1 | 5/2016 | Zhu et al. |

FOREIGN PATENT DOCUMENTS

| | | |
|---|---|---|
| JP | 02240862 A | 9/1990 |
| WO | 2005-030869 A1 | 4/2005 |

\* cited by examiner

WRITE MANAGEMENT FOR INTERLACED MAGNETIC RECORDING DEVICES

CROSS-REFERENCE TO RELATED APPLICATIONS

The present application claims benefit of priority to U.S. Provisional Application No. 62/083,696, entitled "Interlaced Magnetic Recording in HAMR Devices" and filed on Nov. 24, 2014, and also to U.S. Provisional Patent Application No. 62/083,732, entitled "Interlaced Magnetic Recording" and filed on Nov. 24, 2014. Both of these applications are specifically incorporated by reference for all that they disclose or teach.

BACKGROUND

Heat assisted magnetic recording (HAMR) generally refers to the concept of locally heating a recording medium to reduce the coercivity of the recording medium so that an applied magnetic writing field can more easily affect magnetization of the recording medium during a temporary magnetic softening of the recording medium caused by the local heating. HAMR allows for the use of small grain media, with a larger magnetic anisotropy at room temperature to assure sufficient thermal stability, which is desirable for recording at increased areal densities. HAMR can be applied to any type of storage media, including for example, tilted media, longitudinal media, perpendicular media, and/or patterned media.

One drawback to recording technologies such as HAMR is that a written size of magnetic bits is reduced when writing at high linear densities, ultimately limiting an achievable areal density capability (ADC). Better designs are needed to increase ADC in storage media of HAMR devices.

SUMMARY

Implementations disclosed herein provide for a storage device controller configured to write data at a first linear density to alternating data tracks on a storage medium in a storage device and to write data at a second linear density to at least one data track interlaced with the alternating data tracks.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

DETAILED DESCRIPTION

Figure 1:
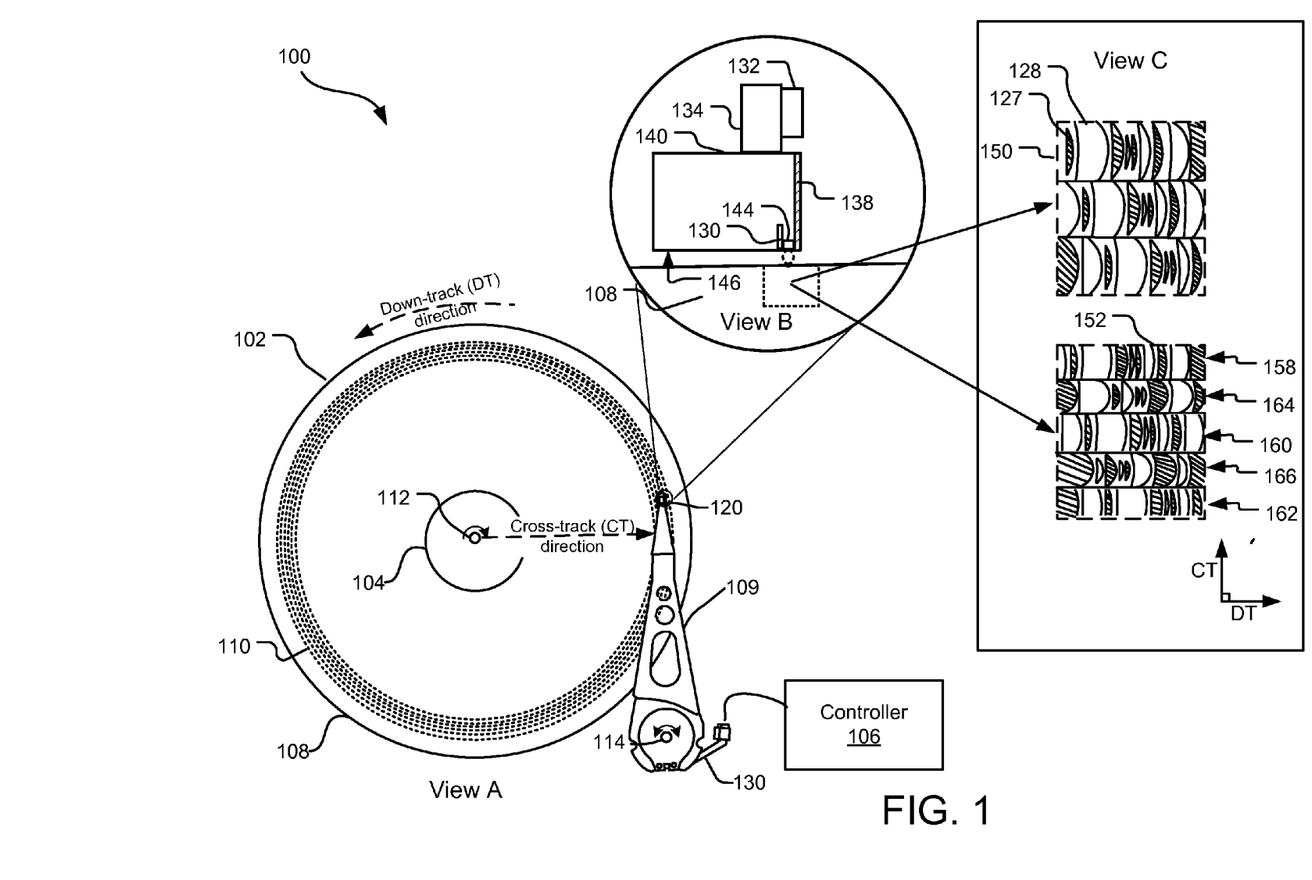
FIG. 1 illustrates a data storage device including a transducer head assembly with a HAMR write head for writing data on a magnetic storage medium.

FIG. 1 illustrates a data storage device 100 including a transducer head assembly 120 for writing data on a magnetic storage medium 108. Although other implementations are contemplated, the magnetic storage medium 108 is, in FIG. 1, a magnetic storage disc on which data bits can be recorded using a magnetic write pole (e.g., a write pole 130) and from which data bits can be read using a magnetoresistive element (not shown). As illustrated in View A, the storage medium 108 rotates about a spindle center or a disc axis of rotation 112 during rotation, and includes an inner diameter 104 and an outer diameter 102 between which are a number of concentric data tracks 110. Information may be written to and read from data bit locations in the data tracks on the storage medium 108.

The transducer head assembly 120 is mounted on an actuator assembly 109 at an end distal to an actuator axis of rotation 114. The transducer head assembly 120 flies in close proximity above the surface of the storage medium 108 during disc rotation. The actuator assembly 109 rotates during a seek operation about the actuator axis of rotation 112. The seek operation positions the transducer head assembly 120 over a target data track for read and write operations.

In one implementation employing HAMR, the recording action is assisted by a heat source applied to a bit location on the storage medium 108 having a very high magnetic anisotropy, which contributes to thermal stability of the magnetization of the small magnetic grains in the storage medium 108. By temporarily heating the storage medium 108 during the recording process, the magnetic coercivity of the grains can be selectively lowered below an applied magnetic write field in a tightly focused area of the storage medium 108 that substantially corresponds to an individual data bit. The heated region is then encoded with the recorded data bit based on the polarity of the applied magnetic write field. After cooling, the magnetic coercivity substantially returns to its pre-heating level, thereby stabilizing the magnetization for that data bit. This write process is repeated for multiple data bits on the storage medium, and such data bits can be read using a magneto-resistive read head.

Referring to View B, the transducer head assembly 120 includes, among other features, a heat source 132 (e.g., a laser) coupled to a submount assembly 134. Light from the heat source 132 is directed into a waveguide 138 mounted to a slider 140. Light exiting the waveguide is focused, via a Near Field Transducer (NFT) 144, and applied to a bit location on the storage medium 108 just before the bit location is subjected to a magnetic pulse generated by the write pole 130. As an air-bearing surface 146 of the slider 140 "flies" across the surface of the storage medium 108, the write pole 130 selectively magnetizes the underlying magnetic grains of the storage medium 108.

View C illustrates magnified views 150 and 152 of magnetic polarized regions (e.g., individual data bits or groupings of data bits of like polarity) recorded on storage medium 108 according to different write methodologies and settings of the storage device 100. The polarized regions are also referred to herein as "data bits" (e.g., a data bit 127), which each represent one or more individual data bits of a same state (e.g., 1s or 0s). For example, the data bit 128 is a magnetically polarized region representing multiple bits of a first state (e.g., "000"), while the adjacent data bit 127 is an oppositely polarized region representing one or more bits of a second state (e.g., a single "1").

The different magnified views 150 and 152 generally illustrate comparative differences based on two different write methodologies. However, the exemplary data bits in each of the magnified views 150, 152 are not necessarily illustrative of the actual shapes or separations of the bits within an individual system configuration.

In each of the magnified views 150 and 152, the data bits each take on a generally "bullet-shaped" appearance, which has been confirmed experimentally in HAMR devices. This general bullet shape of each data bit is due to a thermal gradient reduction that affects off-track positions of the data bit, causing the transition curvature to be different on leading and trailing edges of the data bit.

The magnified view 150 illustrates data bits recorded according to a conventional magnetic recording (CMR) technique. As used herein, CMR refers to a system that allows for random data writes to available cells anywhere on a magnetic media. A random write refers to, for example, a data write of a data track that does not critically impair (e.g., corrupt or erase) data on either adjacent track. In a CMR system, all written data tracks are also of substantially equal width. According to one implementation, the recorded data bits of view 150 are recorded while firing the heat source 132 at a relatively constant power.

To further increase linear density (e.g., kbpi) within a CMR system, system parameters can be altered to decrease a length of each data bit in the down-track direction (DT) and/or to decrease separation between the data bits along each track. However, in HAMR, shortening a data bit in the down-track direction also has the property of shrinking the data bit in the cross-track direction (as illustrated by a short transition 127). Thus, there exists a point at which further gains in linear density decrease system performance by increasing a bit error rate (BER) of data when it is read from the storage media 108.

In some implementations, linear density is increased at the expense of track density (ktpi). For example, an acceptable BER may be maintained while increasing linear density (kbpi) of each data track if the width of the data tracks is uniformly increased. However, widening data tracks decreases the overall areal density capability (ADC), (e.g., the product between linear density and track density) of the storage media 108.

The magnified view 152 illustrates data bits recorded according to another set of system parameters implementing an interlaced magnetic recording (IMR) technique. According to one implementation, the IMR technique illustrated in the magnified view 152 provides for a higher total ADC with a lower observable BER than conventional recording systems.

Specifically, the magnified view 152 illustrates alternating data tracks of different track widths. A first (e.g., higher) power of the heat source 132 is used to write a first grouping of alternating data tracks (e.g., data tracks 158, 160, and 162) having a wide written track width, while a second (e.g., lower) power of the heat source 132 is used to write a second grouping of interlaced data tracks (e.g., the data tracks 164, 166) having a narrower written track width. Data of the narrow, interlaced data tracks overwrites edges of adjacent and previously written data tracks of the wider width. Other implementations of the disclosed technology may provide for data tracks of three or more different written track widths on a same surface of the magnetic storage medium 108.

To generate the IMR pattern shown in magnified view 152, a storage controller 106 of the storage device 100 alters one or more system parameters (e.g., laser power, write current, overshoot, waveform, etc.) based on a discrete write location where data is received and stored on the storage medium 108. For example, the first grouping of data tracks (e.g., the data tracks 158, 160, and 162) may include data of a higher linear density than the interlaced tracks (e.g., the data tracks 164 and 166).

Further, the controller 106 may be configured to systematically direct incoming write commands to different data tracks of the storage medium according to a number of prioritized random access (PRA) rules. For example, the controller 106 selects each storage location to systematically maximize a total number of possible random writes.

The controller 106 includes software and/or hardware, and may be implemented in any tangible computer-readable storage media within or communicatively coupled to the storage device 100. The term "tangible computer-readable storage media" includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can accessed by mobile device or computer. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal.

Figure 2:
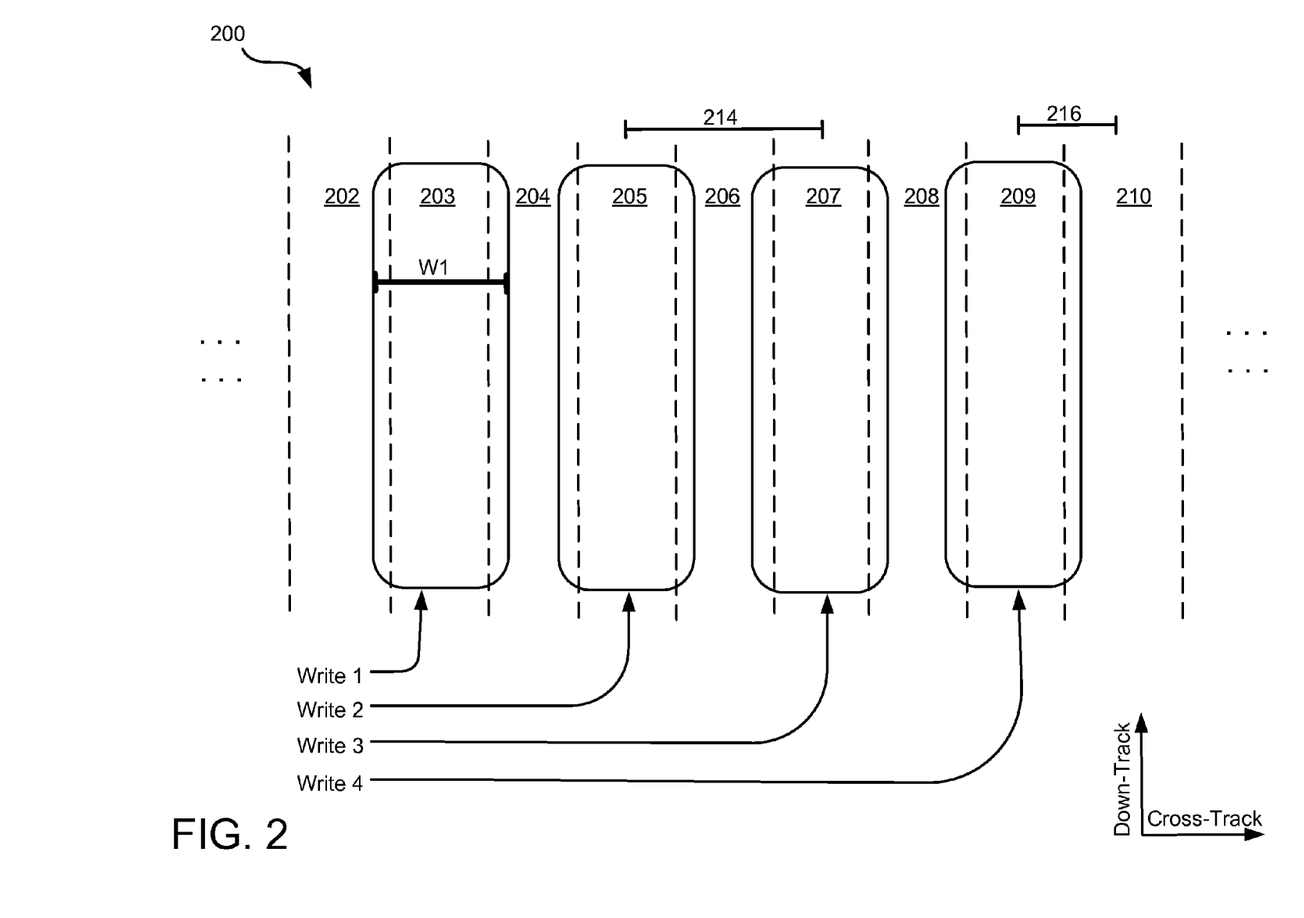
FIG. 2 illustrates example data writes to a magnetic disc utilizing an interlaced magnetic recording technique.

FIG. 2 illustrates example data writes to magnetic disc 200 employing an interlaced magnetic recording technique. The magnetic disc 200 includes a number of circular data tracks (e.g., data tracks 202-210). A controller (not shown) selects data tracks to receive and store incoming data. For each write operation, the controller identifies relevant prioritized random access (PRA) rules and executes the write operation in a manner that satisfies the relevant PRA rules.

In general, PRA rules dictate an order in which two or more data tracks on the magnetic disc 200 are to be written. For example, a PRA rule may specify that the data track 203 is to be written before either of the adjacent data tracks 202 or 204. In this case, the data track 203 is randomly writable if the data tracks 202 and 204 do not contain any data. If however, data is already stored on either of the data tracks 202 and 204, the data write to the data track 203 may include: (1) reading and caching the data on the data tracks 202 and/or 204; (2) writing the data track 203; and (3) subsequently, re-writing the data of the data tracks 202 and/or 204.

A number of other example PRA rules are described below and also with respect to other implementations. These example PRA rules can be optionally included or omitted in any combination from any implementation of the disclosed technology.

In FIG. 2, the dotted lines indicate boundaries between adjacent data tracks having a same track pitch 216, which represents a center-to-center distance between two adjacent data tracks. In one implementation, a same or substantially equal track pitch is employed across an entire surface of the magnetic disc. The track pitch 216 of each data track is smaller than a written track width (W1), (e.g., an actual width of recorded data bits in the cross-track direction) for data written to the first plurality of alternating data tracks 203, 205, 207, and 209. In one implementation, the written track width of the odd-numbered data tracks is less than a spacing 214 between centers of adjacent odd-numbered data tracks (e.g., less than twice the track pitch 216).

In various implementations, the first plurality of alternating data tracks 203, 205, 207, and 209 includes either exclusively even-numbered tracks or exclusively odd-numbered tracks. To simplify nomenclature, the first plurality of data tracks (e.g., those tracks written with higher linear density and a wider bit footprint) are hereinafter referred to as "odd-numbered" data tracks. It should be understood, however, that the odd-numbered tracks may, in practice, be even-numbered tracks and vice versa.

In one implementation, a heat source (e.g., a laser) is powered to locally heat a small area of each data track just before that area is magnetized by a magnetic write pulse. For example, the heat source may be a laser attached to a slider that flies above the surface of the magnetic media while data is recorded. To generate the high-density data tracks of wide written track width (e.g., as shown), a high heat source power is used. To select an appropriate linear density for the odd-numbered data tracks, the linear density may be initially set to a highest achievable linear density and then reduced so that the on-track BER (e.g., bit error rate based on log 10) is just below a target threshold. For example, the on-track BER may be set to 0.3-0.5 decades lower than the target threshold BER.

An optimal power of the heat source may vary according to specific design criteria; however, the heat source power used to write the odd-numbered data tracks is higher than the heat source power used to write the interlaced even-numbered data tracks. In one implementation, power of the heat source is 20-50% higher while writing odd-numbered tracks than while writing even-numbered data tracks. In other implementations, the power of the heat source is greater than 50% higher while writing odd-numbered tracks than while writing event-numbered data tracks.

In one implementation, a PRA rule specifies that data may not be written to any of the even-numbered data tracks (e.g., the data tracks 202, 204, 206, 208, 210) until a capacity condition is satisfied. For example, the capacity condition may be satisfied when a total capacity of data stored on a first surface of the magnetic disc 200 reaches 50-65% of the total storage capacity. Alternatively, the capacity condition may be satisfied when data stored within an individual radial zone of the magnetic disc 200 reaches some percentage of the total storage capacity of that radial zone.

So long as data is written exclusively to the odd-numbered data tracks, the odd-numbered data tracks on the magnetic disc can each be written to at random (e.g., without re-writing data on any other track). At this point in time, adjacent track interference (ATI) is not a limiting concern because the even tracks do not include any data that may be overwritten or corrupted.

The notation ("write 1," "write 2," etc.) at the bottom of FIG. 2 indicates an example order in which the odd-numbered data tracks are written. In other implementations, adjacent odd-numbered data tracks are written to in a different order (e.g., a non-consecutive order).

Figure 3:
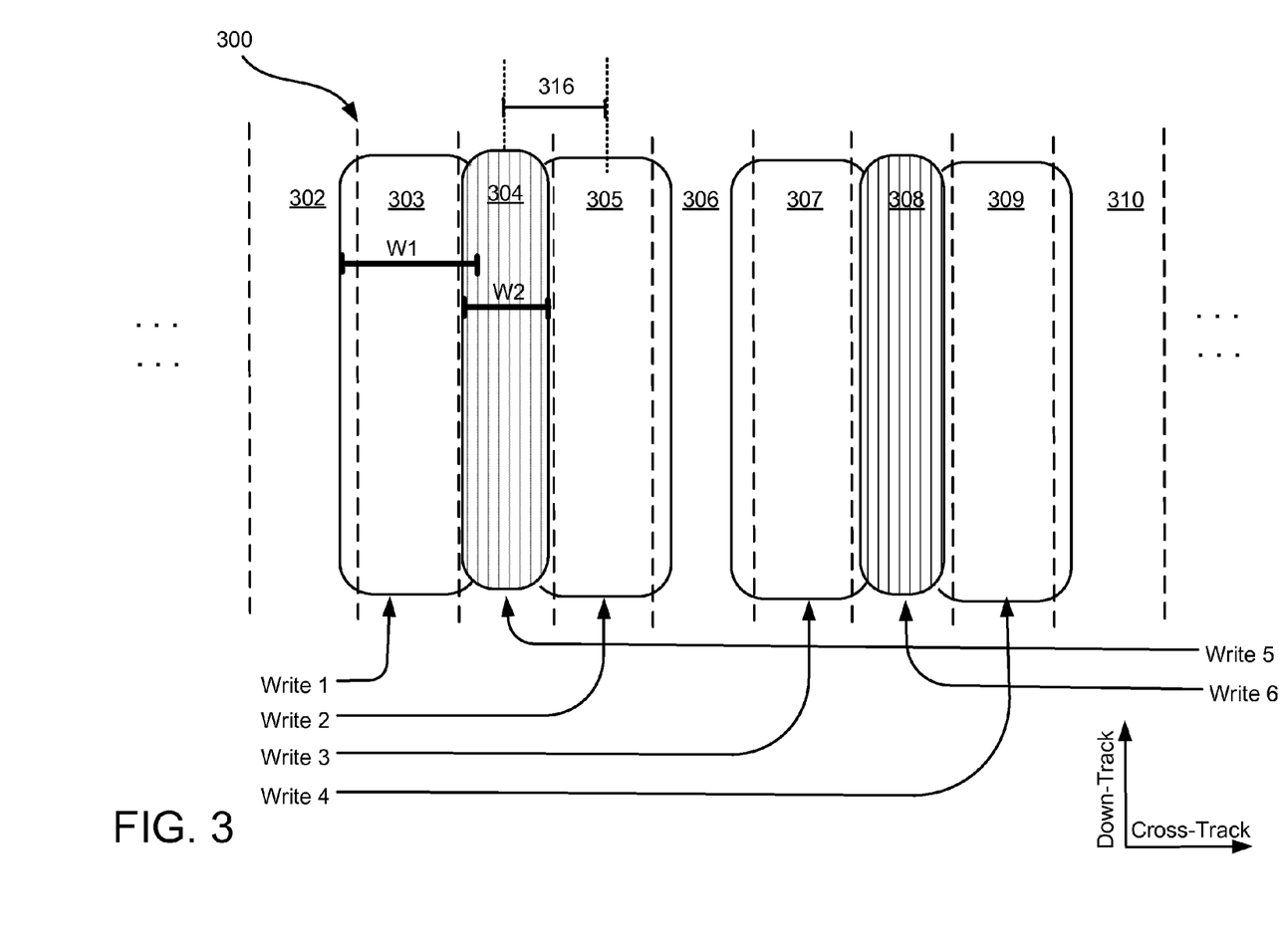
FIG. 3 illustrates other example data writes to a magnetic disc utilizing an interlaced magnetic recording technique.

FIG. 3 illustrates example data writes to a magnetic disc 300 employing an interlaced magnetic recording technique. The magnetic disc 300 includes a number of circular data tracks (e.g., data tracks 302-310). A controller (not shown) selects data tracks to receive and store incoming data. In one implementation, the controller directs the incoming data writes to odd-numbered data tracks (e.g., 303, 305, 307, and 309) so long as a capacity condition is satisfied. After the threshold capacity is reached, the controller begins to direct incoming data writes to even-numbered data tracks (e.g., 302, 304, 306).

In one implementation, even-numbered data tracks are written with a heat source (e.g., a laser) set to operate at a lower power than that utilized to write the data to the odd-numbered data tracks (e.g., the data tracks 301, 303, 305, and 307). Consequently, data bits written to the even-numbered tracks have a written track width (W2) which is narrower than a written track width (W1) of the odd-numbered data tracks. Other system parameters (e.g., write current, overshoot, data waveform, etc.) may be optimized to ensure a best possible linear density for the even-numbered data tracks while maintaining an acceptable SNR/BER margin, such as 0.3 decades.

In one implementation, the written track width W2 of the even-numbered data tracks is less than or approximately equal to a defined track pitch 316 (e.g., a spacing between a center of an even-numbered data track and an adjacent odd-numbered data track). A ratio of track width of odd-numbered data tracks to the track width of even-numbered data tracks (W1/W2) may be, for example, between approximately 1.2/1 and 2/1. In another implementation, the ratio of (W1/W2) is between 1.2/1 and 1.6/1. Other implementations are also contemplated.

In one implementation, a PRA rule specifies that data may not be written to any of the even-numbered data tracks (e.g., the data tracks 302, 304, 306) until a capacity condition is satisfied. For example, a controller of the storage device may fill all of the odd-numbered data tracks of the magnetic disc 300 with high density data of the wider track width before writing data to any even-numbered data tracks.

A data write to an even-numbered data track (e.g., the data track 304) overwrites and effectively "trims" edges of adjacent odd-numbered tracks (e.g., the data tracks 303 and 305) in narrow overlap regions where the data of the odd-numbered data track "bleeds" over the natural track boundaries. For example, a data bits of the narrow data track 304 may overwrite the right edges of data bits of the wider data track 303 and the left edges of a data bits of the wider data track 305. Even though each even-numbered data track overwrites the edge portions of adjacent odd-number data tracks, a readable portion of the data of the odd-numbered tracks is retained in the center region of each odd-numbered data track. Therefore, a bit error rate (BER) of the odd-numbered data tracks 303 and 305 may be substantially unaltered by the data write to the data track 304.

Notably, a random re-write of the data of one of the odd-numbered data tracks (e.g., the data track 303) may overwrite and substantially affect readability of data in adjacent even-numbered data tracks (e.g., the data track 302). Therefore, a data management method utilizing PRA rules is employed to ensure groupings of adjacent data tracks are written in an order such that all data is readable and total read/write processing time is mitigated.

According to one implementation, the data management method entails multiple phases, with different PRA rules applicable during each phase. The data management method may govern data writes to the entire magnetic disc 300, or (alternatively) govern data writes to a subset of the magnetic disc 300, such as a radial zone. In a first phase, data is written exclusively to odd-numbered data tracks at a high linear density (e.g., wide track width) (e.g., as illustrated by "write 1", "write 2", "write 3" and "write 4"). The first phase continues until a capacity condition is satisfied. For example, the capacity condition may be a threshold disc capacity (e.g., 50% of the total disc capacity) or region capacity (e.g., of a radial zone on the disc). Before the capacity condition is satisfied, each odd-numbered data track can be written to at random and directly overwritten without re-writing any data of adjacent data tracks.

After the capacity condition is satisfied, a second phase of the data management method commences. During the second phase, data writes may be directed to even-numbered data tracks. The even-numbered data tracks are written to at a lower linear density (e.g., narrower track width). Writes to data directed exclusively to even-numbered data tracks can be performed at random (e.g., without re-writing data of any adjacent data tracks).

During this second phase of the data management method, some odd-numbered data tracks may be written to randomly and others may not. For example, the data track 303 remains randomly writeable up until the point in time when data is first written to either of adjacent data tracks 302 or 304. Once data is written to either of the data tracks 302 or 304, the odd-numbered data track 303 is no longer randomly writeable. For example, updating data of the data track 303 may entail caching and subsequently re-writing the data of the adjacent data tracks 302 and 304 (if 304 contains data).

In one implementation, every other even-numbered data track is left blank for a period of time while the disk continues to fill up. For example, data is initially written to tracks 304 and 308 (per "write 5" and "write 6", respectively), but not to any of data tracks 302, 306, or 310. So long as every-other even-numbered data track is left blank, non-random data writes entail writing no more than two data tracks at once. For example, writing data to the data track 303 entails (1) reading data tracks 303 and 302 to a temporary cache location; (2) re-writing the data track 303 with one or more updated cells; and (3) re-writing the data track 302 after the write of data track 303 is complete.

In some implementations, the data management method entails a third phase that commences once another capacity condition is satisfied. For example, the third phase may commence after all alternating even-numbered data tracks (e.g., either within a radial zone or across the surface of the disc) include data. Data writes during the third phase of the data management method are further illustrated in FIG. 4.

Figure 4:
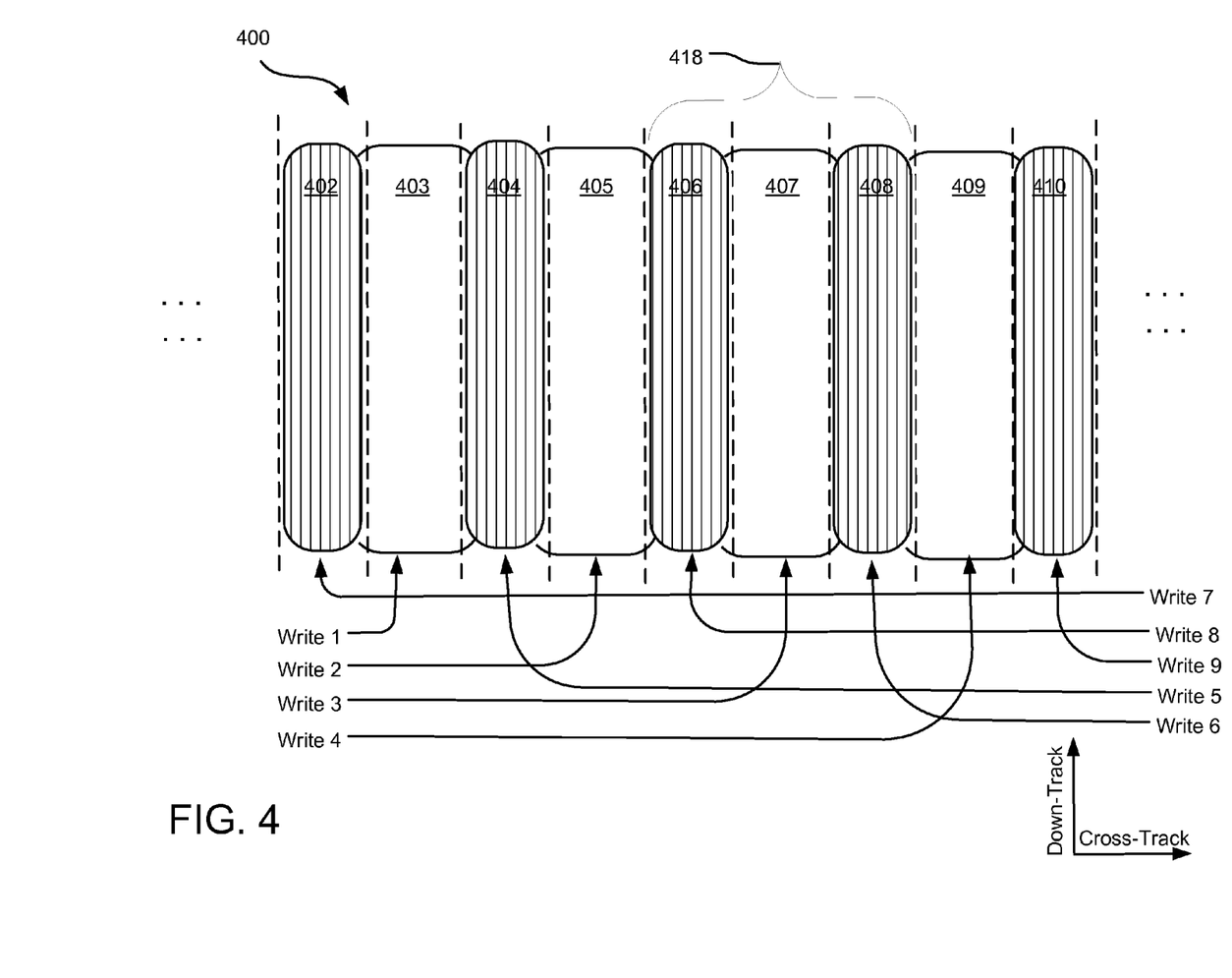
FIG. 4 illustrates still other example data to a magnetic disc utilizing an interlaced magnetic recording technique.

FIG. 4 illustrates example data writes to a magnetic disc 400 employing an interlaced magnetic recording technique. The magnetic disc 400 includes a number of circular data tracks (e.g., data tracks 401, 402, 403, 404, 405, 406, and 407). A controller (not shown) selects data tracks to receive and store incoming data according to a multi-phase data management method. During a first phase of the data management method, the controller directs the new incoming data to odd-numbered data tracks (e.g., via "write 1", "write 2", "write 3", and "write 4", as illustrated) until a first capacity condition is satisfied.

After the first threshold capacity is satisfied, a second phase of the data management method commences and the controller begins to direct new incoming data to every other even-numbered data track (e.g., via "write 5" and "write 6," as shown). After a second capacity condition is satisfied, a third phase of the data management method commences and the controller begins to direct incoming data to the remaining un-filled data tracks (e.g., "write 7," "write 8," and "write 9", as shown).

During this third phase, any of the even-numbered data tracks can be randomly written. However, writing data to any of the odd-numbered data track entails caching and re-writing any data in adjacent even data tracks as well. For example, an update to the data track 403 entails (1) reading data tracks 402, 403, and 404 to a temporary cache location; (2) re-writing the data track 403 with one or more updated cells; and (3) subsequently re-writing the data tracks 402 and 404.

One consequence of the illustrated method is that a size of a non-random data write does not ever exceed three data tracks (e.g., an odd-numbered data track and the two adjacent even-numbered data tracks). This reduces back-end processing as compared to shingled magnetic recording systems that read and write data in groups of "bands" including several (e.g., 10 or more) data tracks at once to provide for increased ADC. Also unlike shingled magnetic recording systems, the illustrated write methodology allows for even-numbered data tracks to written to at random throughout the life of the drive, and for odd-numbered data tracks to be written to at least some period of time as the magnetic disc 400 is filled with data. Thus, performance of the disclosed system exceeds that of widely-available shingled magnetic recording systems. Further, the areal drive capacity achievable via the disclosed system is greater than existing CMR and shingled magnetic recording (SMR) systems.

Figure 5:
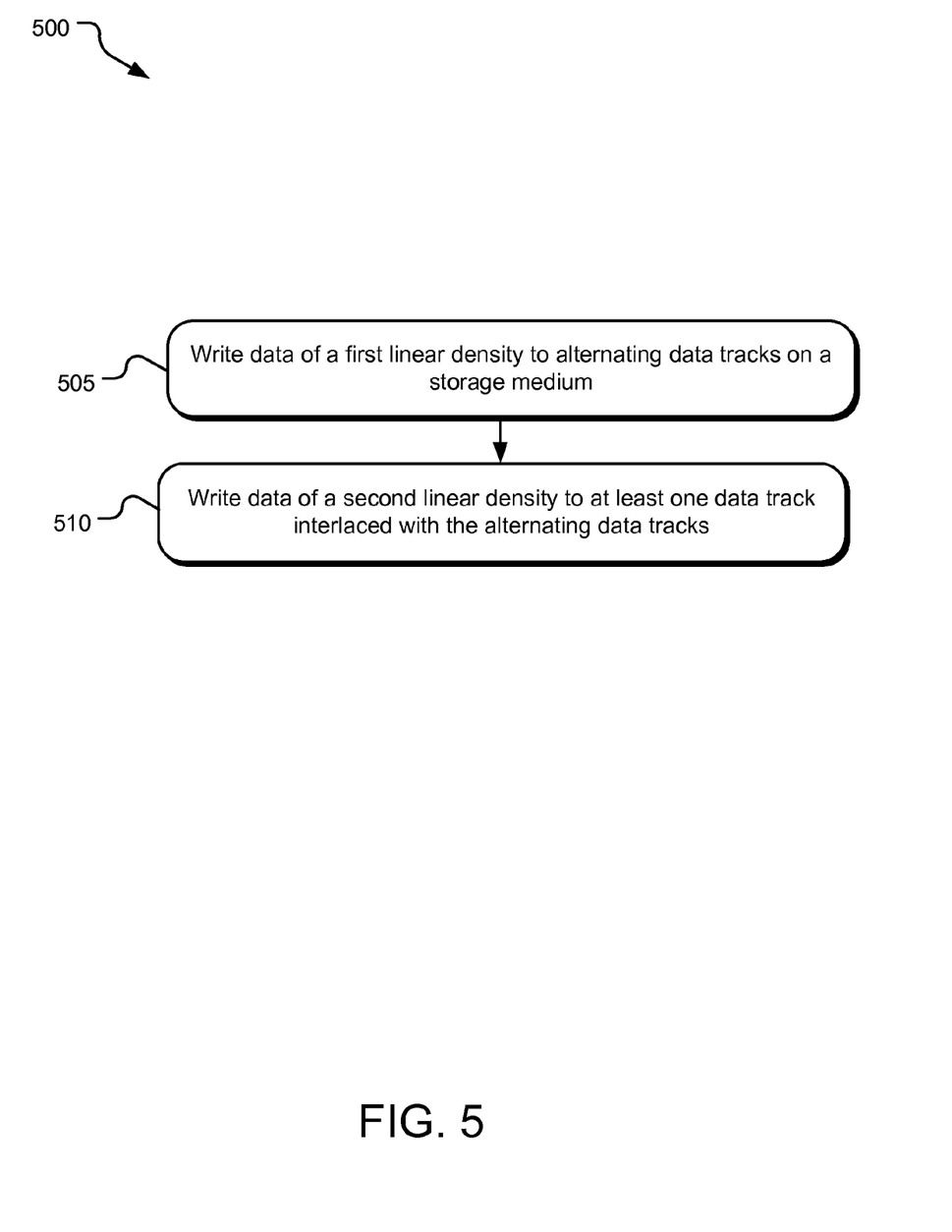
FIG. 5 illustrates example operations for recording data using an interlaced magnetic recording technique.

FIG. 5 illustrates example operations 500 for recording data using an interlaced magnetic recording technique. A first writing operation 505 writes data at a first linear density to a first plurality of alternating data tracks on a storage medium.

A second writing operation 510 writes data at a second linear density to at least one data track interlaced with the alternating data tracks including data of the first linear density. In one implementation, the second linear density is less than the first linear density. For example, a HAMR device may be configured to write data to odd-numbered data tracks at a high linear density with a wide bit width (e.g., a wide track width) and also configured to write data to even-numbered data tracks with a smaller linear density and decreased (e.g., narrower) bit width.

In one implementation, no data tracks of the second linear density are written until a storage capacity condition is satisfied. For example, the first plurality of alternating data tracks may include all odd-numbered data tracks on a disc, and data may be written exclusively to the odd-numbered data tracks until there are no available odd-numbered data tracks to receive new incoming data. So long as no data is written to the even-numbered data tracks, each of the odd data tracks is randomly writeable.

In one implementation, the data tracks of the second linear density have a smaller width than the data tracks of the first linear density. The data tracks of the second linear density are centered so that the edges of each data track overlap and thus "trim" data from the edges of adjacent data tracks of the first linear density. Despite this "trimming" effect, data tracks of the first linear density are still readable because the important information is retained within a center (untrimmed) portion of the data track.

The embodiments of the disclosed technology described herein are implemented as logical steps in one or more computer systems. The logical operations of the presently disclosed technology are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosed technology. Accordingly, the logical operations making up the embodiments of the disclosed technology described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. Apparatus comprising:
a storage device controller configured to:
receive a command to update data stored on a first data track of a storage medium in a storage device;
read a pair of data tracks into a temporary cache, each data track of the pair directly adjacent to an opposite side of the first data track;
updating the data on the first data track; and
after updating the data on the first data track, write data from the temporary cache to the pair of data tracks directly adjacent to the first data track.

2. The apparatus of claim 1, wherein the controller is further configured to write the first data track at a first linear density while operating a heat assisted magnetic recording (HAMR) head at a first power and to write the pair of data tracks at a second linear density while operating the HAMR head at a second power.

3. The apparatus of claim 2, wherein the data written at the first linear density has a greater track width than the data written at the second linear density.

4. The apparatus of claim 2, wherein the storage device controller is further configured to:
write data exclusively to alternating data tracks on the storage medium at the first linear density until a capacity condition is satisfied.

5. The apparatus of claim 4, wherein the storage device controller is further configured to:
after the capacity condition is satisfied, write data at the second linear density to a number of data tracks interlaced between the alternating data tracks.

6. The apparatus of claim 5, wherein the storage controller is configured to randomly write data to the number of data tracks interlaced between the alternating data tracks.

7. The apparatus of claim 2, wherein the storage device controller is configured to write data to the first data track and the pair of data tracks directly adjacent to the first data track with a single HAMR head.

8. A method comprising:
receiving a command to update data stored on a first data track of a storage medium in a storage device;
reading a pair of data tracks into a temporary cache, each data track of the pair directly adjacent to an opposite side of the first data track;
updating the data on the first data; and
after updating the data on the first data track, writing data from the temporary cache to the pair of data tracks directly adjacent to the first data track.

9. The method of claim 8, further comprising:
writing data to the first data track at a first linear density while operating a HAMR head at a first laser power; and
writing data to the pair of data tracks directly adjacent to the first data track at a second linear density while operating the HAMR head at a second laser power.

10. The method of claim 9, wherein the data written at the first linear density has a greater track width than the data written at the second linear density.

11. The method of claim 9, further comprising:
writing data exclusively to alternating data tracks on the storage medium at the first linear density until a condition is satisfied.

12. The method of claim 11, further comprising:
after the capacity condition is satisfied, writing data at the second linear density to a number of data tracks interlaced between the alternating data tracks.

13. The method of claim 11 further comprising:
randomly writing at least one data track interlaced between the alternating data tracks.

14. The method of claim 8, further comprising:
writing data to the first data track at a first linear density; and
writing data to the pair of data tracks directly adjacent to the first data track at a second linear density.

15. Apparatus comprising:
a storage device controller configured to:
receive a command to update data stored on a first data track having a first written track width;
read into a temporary cache data of the first data track and data of a pair of data tracks, each data track of the pair directly adjacent to an opposite side of the first data track, the pair of data tracks having a second written track width;
update the data on the first data track at the first written track width; and
after updating the data on the first data track, write data from the temporary cache to the pair of data tracks at the second written track width.

16. The apparatus of claim 15, wherein the storage device controller is further configured to:
write data at a first linear density to the first data track and write data at a second linear density to the pair of data tracks directly adjacent to the first data track.

17. The apparatus of claim 15, wherein the storage device controller is further configured to:
write data to the first data track while operating a HAMR head at a first laser power; and
write data to the pair of data tracks directly adjacent to the first data track while operating the HAMR head at a second laser power.

18. The apparatus of claim 15, wherein writing data to the pair of data tracks directly adjacent to the first data track overwrites data along edges of the first data track.

19. The apparatus of claim 15, wherein the storage device controller is further configured to:
randomly write data to either track of the pair of data tracks directly adjacent to the first data track.

20. The apparatus of claim 15, wherein the storage device controller is further configured to:
write data to a first plurality of alternating data tracks on a storage medium in a storage device until a capacity condition is satisfied; and
after the capacity condition is satisfied, write data to a second plurality of alternating tracks according to a non-consecutive track order, wherein the second plurality of alternating data tracks is interlaced with the first plurality of alternating data tracks.

* * * * *